Sept. 15, 1959   W. P. NAIL   2,904,103
CAR SEAT COVER
Filed Aug. 6, 1956
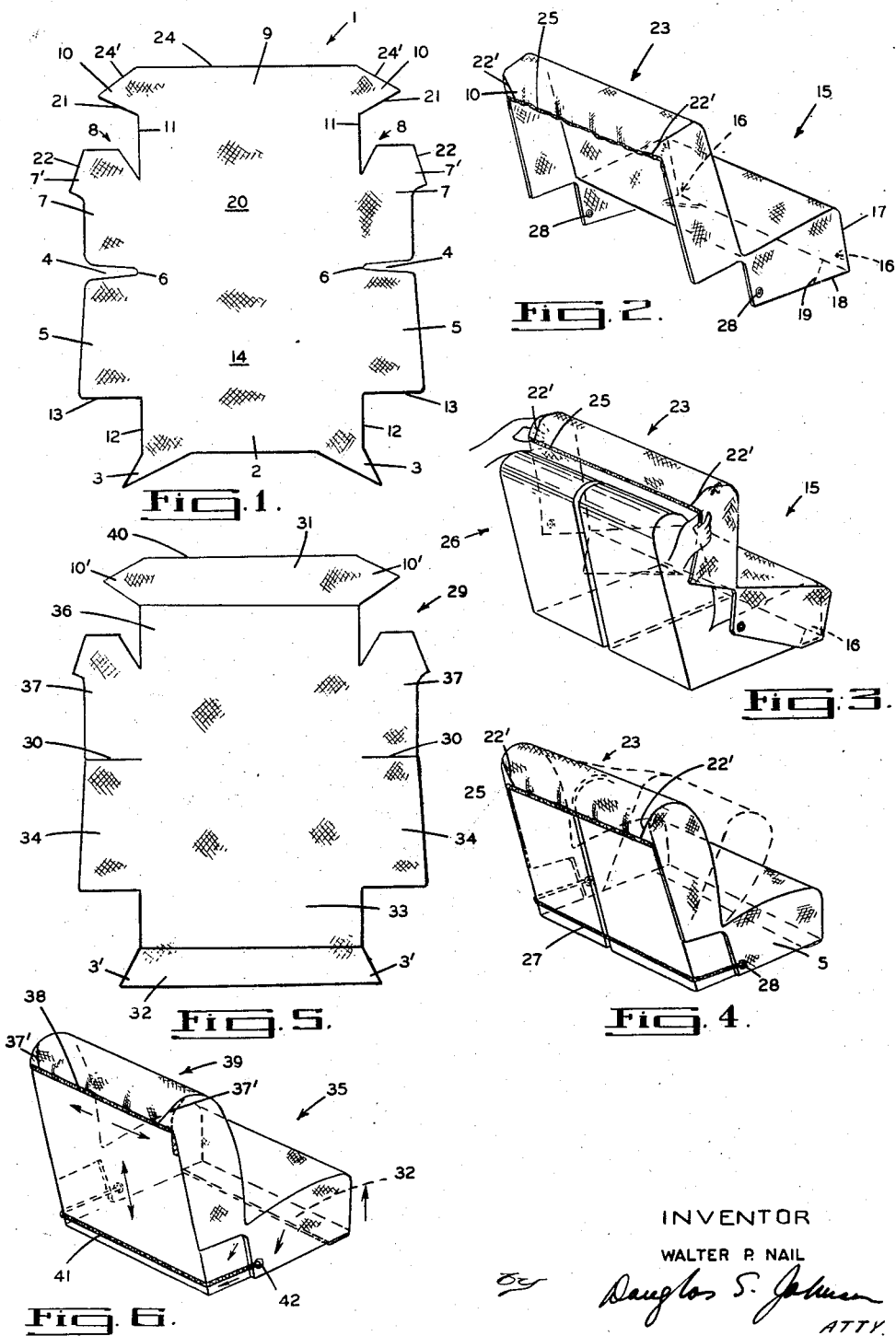
INVENTOR
WALTER P. NAIL
ATTY.

United States Patent Office 2,904,103
Patented Sept. 15, 1959

2,904,103

CAR SEAT COVER

Walter P. Nail, Toronto, Ontario, Canada

Application August 6, 1956, Serial No. 602,177

9 Claims. (Cl. 155—182)

This invention relates to improvements in seat covers for a vehicle seat structure and the like and more particularly to seat covers for a split seat construction.

The principal object of this invention is to provide a seat cover which can be accommodated to the various widths and thicknesses of a vehicle seat structure and further, which can be slipped on and removed in a matter of seconds.

More particularly, it is another principal object to provide a seat cover as aforesaid which will allow split seat movement without damaging or dislodging the cover, while another important object is to provide a seat cover having a tailored and pleasing appearance.

Another important object of this invention is to provide a seat cover construction which can be more readily conformed to the contours of the seat structure while at the same time providing additional means of securing the seat cover in position.

It is another object of this invention to provide a seat cover as aforesaid which can be stored in a small space and further to provide a seat cover having durability and wear resistant properties.

Another object of this invention is to provide a seat cover which is inexpensive to manufacture.

The principal feature of this invention resides in forming a seat cover from a blank having a back conforming panel integral with a seat conforming panel to conform to the back and seat of a vehicle seat structure respectively, the back conforming panel terminating in a permanent pocket formation adapted to receive the upper portion of the back of a vehicle seat structure and having a width greater than the back panel to provide excess pocket volumes at each corner of the back of a vehicle seat structure and a strip of woven elastic material or other suitable means incorporated into the permanent pocket formation to collapse the excess pocket volumes and conform the pocket formation to the contour of the back of the vehicle seat structure.

It is another principal feature to provide a seat cover as aforesaid with enough excess pocket volume to permit the swinging of the back of a split seat construction without damaging or destroying the cover, the elastic strip incorporated into the permanent pocket formation conforming the seat cover to the back to present a tailored appearance at all times.

Another feature of the invention resides in providing a seat cover as aforesaid wherein the seams are located in positions removed from the points of stress taken by the cover when it is applied to a vehicle seat structure.

Another feature of the invention resides in forming a vehicle seat cover as aforesaid in which the seat conforming panel terminates in a second permanent pocket formation at the opposite end and is adapted to receive the forward portion of the seat of a vehicle seat structure, the second pocket formation having a greater width than the seat panel to provide excess pocket volumes at each corner thereof and a strip of elastic or other suitable means incorporated into the second permanent pocket formation to collapse the excess pocket volumes and conform the latter pocket to the contour of the forward portion of the seat of a vehicle seat structure.

Again another feature resides in forming a seat panel with a pair of permanent corner pocket formations which have excess pocket volumes and are adapted to receive the forward lower corners of a vehicle seat structure, the corner pocket formations incorporating elastic strips or the like to conform the pockets to the contour of the vehicle seat structure.

These and other objects and features will become apparent from the following description taken in conjunction with the accompanying drawings in which:

Figure 1 is a plan view of a blank of material cut ready for folding into a seat cover formation in accordance with the invention;

Figure 2 is a perspective view of a seat cover formed from the blank of Figure 1 showing it in seat conforming relation;

Figure 3 is a perspective view showing the seat cover of Figure 2 being applied to a split seat construction;

Figure 4 is a view further to Figure 3 showing the seat cover of Figure 2 applied to a split seat construction;

Figure 5 shows a blank cut in accordance with a modified form of the invention;

Figure 6 is a perspective view of a seat cover formed from the blank of Figure 5 having been applied to a vehicle seat structure.

Referring first to Figures 1 to 4, a blank, generally designated at 1, is cut from a panel of a preferably heat sealable plastic material to provide an integral front flap 2 having integral corner portions or ears 3 extending outwardly beyond the end of the front flap 2.

The blank 1 is slit inwardly as at 4 to provide a pair of integral end seat flaps 5, the slits 4 being curved at their inner ends as at 6 to prevent rupture of the material under movement of an occupant of a seat protected by the seat cover. Further, the slits 4 may be varied in their extent to accommodate various seat dimensions.

The blank 1 is further cut to provide a pair of integral end back flaps 7 which are cut somewhat transversely and diagonally inwardly as at 8 in conformity with the general shape of the upper ends of the back of a vehicle seat structure, and formed with laterally extending ears 7′.

The blank 1 is further cut to provide a top flap 9 which is formed with integral laterally extending corner portions or ears 10, the edges 11 of the top flap 9 having substantially the same extent as the edges generally designated at 8 of the end back flaps 7.

Similarly, the edges 12 of the front flap 2 have substantially the same extent as the edges 13 of the end seat flap 5.

The blank of Figure 1 is adapted to be folded to conform to a vehicle seat structure as generally shown in Figure 2 with the front flap 2, end seat flaps 5, and corner portions or ears 3, being folded relative to and co-operating with the adjoining seat panel 14 of the blank 1 to form a seat conforming formation generally designated at 15 and presenting a pair of permanent corner pocket formations 16 having excess pocket volumes which are adapted to receive the forward lower corners of a vehicle seat structure as particularly illustrated in Figure 3.

The adjoining edges of the front flaps 2, the end seat flaps 5 and the corner portions 3 are secured together as at 17 and 18, respectively, to form permanent seat conforming and corner receiving pocket formations 16, respectively, the latter having excess pocket volumes.

Incorporated into the corner pocket formations 16 are strips of woven elastic material or other like material, which are not shown, to reduce or collapse the excess volumes of the corner pocket formations 16, conforming the seat cover to the contours of the vehicle seat structure and preventing the seat cover from being dislodged therefrom. Preferably, the elastic material is in the form of a strip and extends along the lip or edge 19 of the pocket 16, terminating, preferably, in the edges of the front flap 2 and seat flaps 5 at points spaced from the corner pockets 16.

The integral pair of end back flaps 7 and ears 7' are folded relative to and co-operate with the top flap 9 and corner portions or ears 10, to define with the adjoining back panel 20 of the blank 1 a pocket formation having a greater width than the back panel 20. More particularly, the edges 8 of the end back flaps 7 are reunited with the top flap 9 along the edges 11 thereof, with the edges 21 of the ears 10 being reunited with the edge portions 22 of the ears 7' to form a permanent pocket formation 23, as seen in Figures 2 and 3, to receive the top portion of the back of a vehicle seat structure and, by virtue of the extent of the ears 7' and 10, have excess pocket volumes at the corners thereof.

The seam 22' created by securing the abutting edges 21 and 22 extends diagonally inwardly and downwardly and is spaced from the corners of the back of the vehicle split seat 26 at which points stress is taken by the corner when the cover is applied to the back.

Incorporated into the pocket formation and preferably secured to the edges 24 and 24' of the pocket formation 23 is a woven elastic strip 25 or other suitable material which acts to collapse or diminish the excess pocket volumes of the permanent pocket formation 23, to conform the seat cover to the contours of various vehicle seat structures, the elastic strip 25 also accommodating the movement of a split seat structure 26 as particularly seen in Figure 4. The woven elastic strip 25 terminates, preferably, on the edges of the end seat flaps 7 at points spaced from the top flap 9.

As shown in Figure 3, the pocket formation 23 may be expanded by tensioning the elastic strip 25 and the seat cover may be applied over the back of a split seat construction generally designated at 26, the seat conforming formation 15 and the corner pocket formations 16 having been applied to the seat and corners of the split seat construction prior to this operation.

As seen in Figure 4, a cord or tie 27, preferably of woven elastic or other similar material, is secured by grommets 28 located in the rearward portion of the end seat flaps 5 and passes around the lower rear portion of the seat, urging the seat conforming formation 15 and pocket formation 16 of the seat cover rearwardly.

As particularly seen in Figure 4 the excess volumes of the permanent pocket formation 23 allow one of the back rests of a split seat structure to be moved forwardly without damage or dislodgement of the seat cover. Further, by incorporating the elastic means 25 into the pocket formation the seat cover assumes a neat, tailored appearance which is pleasing to the eye when the split seat has been moved back into its normal position.

In the modification shown in Figures 5 and 6, the blank 29 is similar to the blank 1, with the exception that the slits 30 have a narrow configuration as compared with the slits 4 and also the blank is shown being formed with separate panels 31 and 32 having integral corner formations or ears 10' and 3', respectively.

As shown in Figure 5 the panel 32 has a greater dimension in width than the seat panel and is adapted to form on folding with the associated front flap 33 and end seat flaps 34, and securing along the abutting edges, a full, permanent pocket formation generally designated as at 35 in Figure 6, having excess pocket volumes at the corners thereof by virtue of the ears 3', the panel 32 extending from one side of the seat structure to the other.

The panel 31 is secured to the top flap 36 and end back flaps 37 in the same manner as previously described in connection with the blank of Figure 1, to provide a permanent pocket formation 39 with excess pocket volumes at the corners thereof and seams 37' which are spaced from the points of stress at the corners of the back of a vehicle seat construction.

The panels 31 and 32 can be made integral with the blank 20 where the width of the material allows the whole blank to be cut therefrom but where the material has not sufficient width, panels 31 and 32 are separately cut and then united with the top flap 36 and front flaps 33, respectively.

As in the case with the blank of Figure 1 and seat cover formed therefrom, an elastic strip 38 is secured by suitable means to the edge 40 of the pocket formation 39 at the rear of the seat structure as shown in Figure 6 and extends down the edges of the end back flaps 37 which serve to hold the pocket formation 39 in seat conforming relation and further to accommodate the movement of a split seat structure.

Also a cord or tie 41 is secured in grommets 42 in the end seat flaps 34 and extends around the rear of the seat urging the seat conforming formation 35 into engagement with the seat.

It will be appreciated that while the preferred embodiments of this invention have been described and illustrated, various modifications may be made without departing from the scope of the invention as set out in the appended claims.

What I claim as my invention is:

1. In a vehicle seat cover having a central panel comprising a back-rest portion and a seat portion adapted to extend down the front of the back-rest, across the seat and down the front of the seat of a vehicle seat structure, the back-rest portion of said panel terminating in an expansible, permanently formed pocket formation having a substantial depth, said pocket formation being defined by a top panel and pair of end panels attached to said central panel, which are adapted to conform down the back and around the sides of the back-rest of a vehicle seat structure, respectively, to cover same, one of said top flap and said pair of end panels having tapered ear portions adapted to extend beyond the portion of a vehicle seat back-rest which is to be covered thereby, each ear portion having its side edge cut obliquely to the side edge of the panel to which it is attached, whereby said abutting top panel edges and said end panel edges and obliquely cut edges of said ears on being secured, defining a pocket having a tapered expansible rear wall.

2. In a vehicle seat cover according to claim 1, in which said pair of end panels are each provided with said ear portions, whereby the seams defined by the secured abutting edges of said ears and top panel are adapted to extend diagonally inwardly and downwardly from the upper corners of a back-rest of a vehicle seat structure to which the cover is to be applied.

3. In a vehicle seat cover according to claim 1 in which said top panel and said pair of end panels are each provided with said ear portions.

4. A vehicle seat cover formed from a blank having a continuous seam free central panel comprising a back-rest portion and a seat portion adapted to extend down the front of the back-rest, across the seat and down the front of the seat of a vehicle seat structure, said back-rest portion of said panel terminating in a permanently formed pocket formation having a rear wall with a fullness to provide an excess pocket volume, said pocket formation being formed from a pair of end panels and a top panel, each of said end panels and top panel having ear portions extending therebeyond and cut obliquely to the side edges of said end panels and top panel respectively, said end panels, top panel and ears on being folded into abutting relation, and secured together along their abutting edges defining said pocket formation, and said seat portion of said panel having integral end and front panels folded and secured into said seat conforming relation.

5. In a vehicle seat cover having a central panel comprising a back-rest portion and a seat portion adapted to extend down the front of the back-rest, across the seat and down the front of the seat of a vehicle seat structure, the back-rest portion terminating in a permanent pocket formation having an expansible rear wall to provide excess pocket volume, said pocket formation being formed from a top panel and a pair of end back panels having laterally extending ears cut obliquely to the side edges of said end panels and tapering upwardly and outwardly, said top panel and end back panels and ears on being folded into pocket forming relation, and secured along their adjacent abutting edges defining said pocket formation, the seam formed by uniting the adjacent edges of said top panel and obliquely cut ears being adapted to extend diagonally inwardly from the upper corners of the back of a vehicle seat structure, and said seat portion of said panel having end and front panels folded and united together in seat conforming relation.

6. A vehicle seat cover formed from a blank having integral back-rest and seat panels adapted to extend down the back-rest and across the seat of a vehicle seat structure respectively, said back-rest panel having a pair of end flaps and a top flap formed with laterally projecting ears cut obliquely to the side edges thereof and tapering upwardly and outwardly, said end and top flaps and ears being folded having their adjacent edges disposed, on folding, in abutting relation, said abutting edges being secured together to form a permanent pocket formation having a tapered rear wall adapted to receive the upper portion of a back-rest and having excess pocket volume, and elastic means incorporated into said pocket formation to conform said pocket formation to a back-rest and said seat panel having end and front flaps folded and secured together in seat conforming relation.

7. A seat cover according to claim 6 in which said front flap, integral with said seat panel, is formed with a pair of ears, which on folding said integral end and front flaps, and securing the abutting edges of said end panels, front panel and ears, form permanent pocket formations to receive the lower front corners of a vehicle seat structure.

8. A seat cover according to claim 7 in which said latter pocket formations have elastic means incorporated therein for conforming said pocket formations to the lower front corners of a vehicle seat structure.

9. A seat cover according to claim 6 in which said integral end flaps of said back-rest panel are formed with laterally projecting ears, the edges of said latter ears being cut obliquely to the edges of said top panel and being adapted to abut and be secured to the obliquely cut edges of said first mentioned ears of the top panel whereby the seam formed by uniting said edges is adapted to extend diagonally inwardly of the corners of the back-rest of a vehicle seat structure to which it is to be applied.

References Cited in the file of this patent
UNITED STATES PATENTS

| | | |
|---|---|---|
| 2,619,156 | Seaman | Nov. 25, 1956 |
| 2,696,872 | Kurland et al. | Dec. 14, 1957 |